United States Patent Office 2,855,435
Patented Oct. 7, 1958

2,855,435

SUBSTITUTED HYDRAZINES BY REACTION OF DICHLOROUREA WITH AMINES

Gerald F. Grillot, Syracuse, N. Y., and Richard C. Chang, Louisville, Ky., assignors to W. R. Grace & Co., New York, N. Y., a corporation of Connecticut No Drawing. Application March 27, 1958
Serial No. 724,244

3 Claims. (Cl. 260—554)

This invention relates to a novel process for producing diethylbiurea.

The principal object of the present invention is to provide a method of reacting dichlorourea with ethylamine to form diethylbiurea.

Other objects of the present invention will be evident from the following description.

Diethylbiurea is an old compound. R. Stolle, Berichte 43, 2470 (1910) obtained diethylbiurea

by reacting hydrazodicarbonazid

and ethylamine.

Prior art, see R. L. Datta, J. Chem. Soc., 101, 166–69 (1912) and Datta et al., J. A. C. S., 35, 1183–1185 (1913), teaches that the action of ammonia on dichlorocarbamide (i. e., dichlorourea) results in the formation of p-urazine; when certain lower amines of the aliphatic series (e. g., allylamine) and higher amines (e. g., benzylamine) were used as reactants (instead of ammonia) the products were p-urazine and the chloroamines corresponding to the starting amine reactants.

In addition to the work of Datta (supra) on allylamine and benzylamine, we have found that methylamine also fails to give any dimethylbiurea when reacted with chlorourea; i. e., methylamine and dichlorourea produced a white precipitate, which analyzed 21.9% N instead of theoretical 38.3% N contained in dimethylbiurea. Surprisingly we have now found that the reaction of ethylamine with dichlorourea in a dilute aqueous solution results in a white precipitate. Analysis shows the precipitate to be diethylbiurea. The reaction is highly exothermic. The reaction rate is increased and the product solidifies more readily when the reaction is carried out at temperatures in the range of −10° to +10° C. For this reason the reaction is usually carried out in an ice bath or other suitable means for readily dissipating the heat evolved by the reaction. A dichlorourea/amine mole ration of 1:1 is sufficient to produce the product but in some cases an excess of the amine will decrease the reaction time and increase the product yield.

The following example shows the procedure followed in obtaining the products.

Example 1

6.5 grams (0.05 mole) of dichlorourea were placed in a large flask surrounded by an ice bath. Water is added in sufficient quantity to dissolve the dichlorourea. 2.25 grams (0.05 mole) of ethylamine is slowly added to the dissolved dichlorourea solution thereby causing an exothermic reaction. The ice bath maintains the reaction rate by dissipating the heat evolved. The solid product (diethylbiurea) is separated from the solution. It is a white solid having a melting point of 249° C. Elemental analysis gave C 41.7% (theory 41.4%) and N 31.9% (theory 32.1%).

Diethylbiurea can be used as a depot fertilizer. The product hydrolyzes slowly thereby allowing the nitrogen content sufficient time to be absorbed by the plants before being washed away. Twenty grams of diethylbiurea were worked into the top inch of soil around a newly transplanted 3-year old Pauls Scarlet Climber (Blaze rose). The plant required no further nitrogen-containing fertilizer during the season.

We claim:

1. The process of preparing a product of the class of compounds having the formula

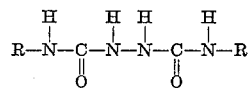

in which R is an ethyl radical which comprises subjecting dichlorourea to the action of ethylamine in aqueous solution, and recovering the resulting product.

2. The process of claim 1 in which the dichlorourea:amine mole ratio is in the range of 1:1 to 1:2.

3. The process of claim 1 in which the reaction is carried out at a temperature in the range of minus 10° to plus 10° C.

No references cited.